United States Patent
Piccinini et al.

(10) Patent No.: US 8,943,595 B2
(45) Date of Patent: Jan. 27, 2015

(54) GRANULAR VIRUS DETECTION

(75) Inventors: Sandro Piccinini, Rome (IT); Luigi Pichetti, Rome (IT); Marco Secchi, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 13/183,744

(22) Filed: Jul. 15, 2011

(65) Prior Publication Data
US 2013/0019313 A1  Jan. 17, 2013

(51) Int. Cl.
*G06F 21/56* (2013.01)

(52) U.S. Cl.
CPC ............................. *G06F 21/564* (2013.01)
USPC ............................. 726/24; 726/22; 726/25

(58) Field of Classification Search
CPC ............ G06F 21/56; G06F 21/561–21/565; G06F 21/568
USPC .................................. 726/22–25
See application file for complete search history.

(56) References Cited

U.S. PATENT DOCUMENTS

| 7,020,895 B2 | 3/2006 | Albrecht |
| 8,196,203 B2 | 6/2012 | Viljoen |
| 2002/0083341 A1* | 6/2002 | Feuerstein et al. ............ 713/201 |
| 2008/0307527 A1* | 12/2008 | Kaczmarski et al. .......... 726/24 |
| 2008/0320594 A1* | 12/2008 | Jiang .............................. 726/24 |
| 2010/0077479 A1 | 3/2010 | Viljoen |
| 2010/0115620 A1* | 5/2010 | Alme ............................. 726/24 |

FOREIGN PATENT DOCUMENTS

JP        2008047123 A     2/2008

OTHER PUBLICATIONS

"Norton Antivirus for Macintosh User's Guide" © 2000 Symantec Corp. (60 pages) https://helpdesk.its.uiowa.edu/handouts/navmacuserguidev7.pdf.*

* cited by examiner

*Primary Examiner* — Joseph P Hirl
*Assistant Examiner* — Thomas Gyorfi
(74) *Attorney, Agent, or Firm* — Yee & Associates, P.C.; Parashos Kalaitzis

(57) ABSTRACT

A group of files for an application installed on a computer system is identified in response to a request to scan the application for malware. The group of files for the application is scanned for the malware. A result is obtained. An action is performed based on the result.

18 Claims, 7 Drawing Sheets

GRANULAR VIRUS DETECTION

BACKGROUND

1. Field

The disclosure relates generally to data processing, and in particular, to malware detection. Still more particularly, the present disclosure relates to a method and apparatus for scanning files for malware.

2. Description of the Related Art

Scanning programs, such as anti-virus programs, identify a presence of malicious software on a computer by performing a scan of the file system of the computer. Anti-virus programs search for patterns within computer code in the file system to determine if code recognizable as malware is present. In addition, anti-virus programs search for variations of known malicious code. Anti-virus programs may separate a file and run the file in a controlled environment that cannot reach any other part of the computer system to determine if the file performs any harmful actions.

Anti-virus programs may scan files on one or more drives on a computer. Anti-virus programs may scan files by type. For example, the most common types of files are executable files and data files. Executable files contain a set of instructions that the kernel of the operating system may send to the processor. Once the set of instructions is sent to the processor, actions may be performed by the executable file with or without a user's interaction. Data files store information and cannot perform functions. Data files may be accessed by programs and may include images, text, program settings, and numbers. Other types of files are scripts that are not loaded as software, but are executed as commands after which the script does not remain running. Other files may contain instructions for special features, but may not be a required part of a file. Additional file types exist, and a scan may be performed on files by type.

An anti-virus scan is conducted at configured locations in the file system. A status of the file system is reported to a user of the anti-virus program. The anti-virus program may, if directed, take one or more actions. The one or more actions may include a repair of an infected file system. Scanning files for malware uses computer resources, and performance usually decreases while a scan is running. In addition, scanning files for malware takes up significant amounts of time in which the performance of the computer system may be less than desired.

Accordingly, it would be advantageous to have a method, apparatus, and computer program product that takes into account one or more of the issues discussed above, as well as possibly other issues.

SUMMARY

The different illustrative embodiments provide a method, data processing system, and computer program product for processing files. A group of files for an application installed on a computer system is identified in response to a request to scan the application for malware. The group of files for the application is scanned for the malware. A result is obtained. An action is performed based on the result.

DETAILED DESCRIPTION

Figure 1:
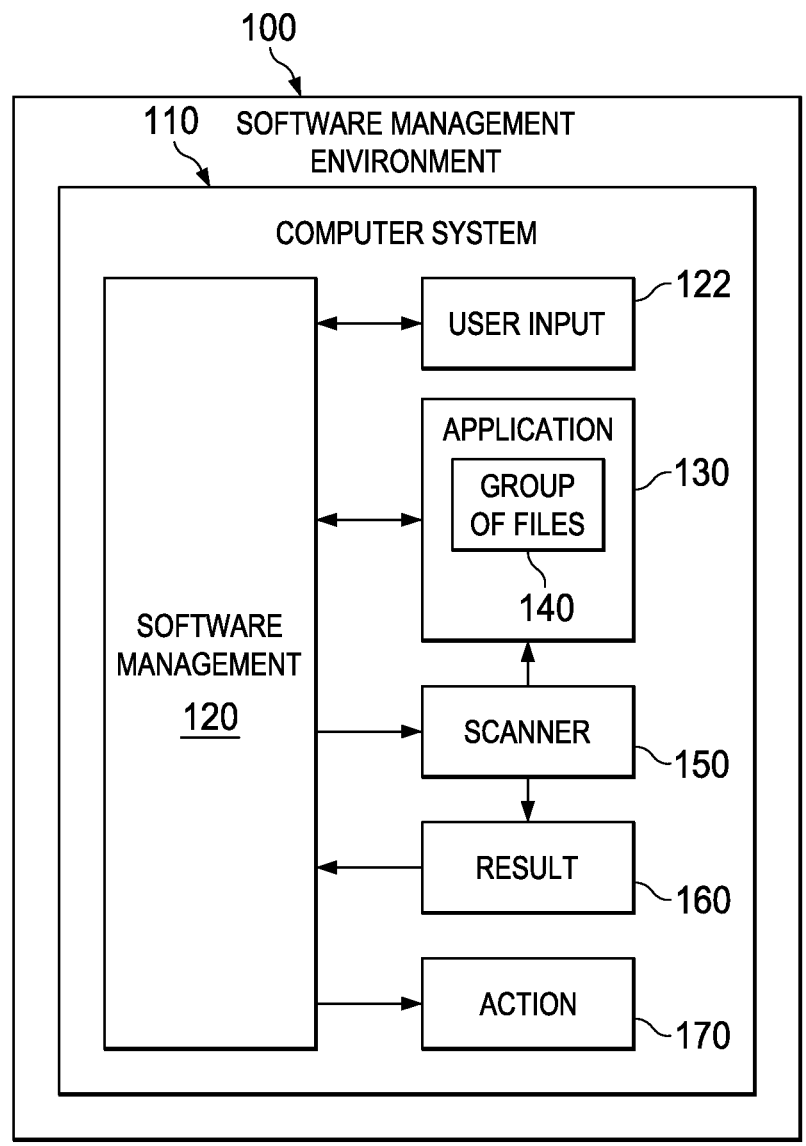
FIG. 1 is an illustration of a block diagram of a computer system in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The different illustrative embodiments recognize and take into account that applications and files associated with applications must be protected from malware. As used herein, "malware" means malicious software and as used herein, means any form of hostile, intrusive, or annoying software or program code. For example, malicious software may be programming code, scripts, active content, and other software designed to disrupt or deny operation, gather information that leads to loss of privacy or exploitation, gain unauthorized access to system resources, and other abusive behavior. Malware may include, without limitation, computer viruses, worms, trojan horses, spyware, dishonest adware, scareware, crimeware, most root kits, and other malicious and unwanted software or program.

The illustrative embodiments recognize and take into account that an anti-virus program may be invoked manually to scan a custom file list. For example, a user may retrieve a custom list of files from an installation media of an application by manually selecting files for the custom file list. The user may then send the custom list of files to the anti-virus program and instruct the anti-virus program to scan the files in the custom list.

The illustrative embodiments recognize and take into account that an application may embed files into an installer. In addition, the illustrative embodiments recognize and take into account that an application may call other installers.

Furthermore, the illustrative embodiments recognize and take into account that an application may retrieve files from remote servers as needed.

The illustrative embodiments recognize and take into account that application packagers, application testers, or application developers in software management environment 100 in FIG. 1 may want to know if an application is infected in some way after a specific test, after other products are downloaded, or before packaging it and sending it to the market.

The illustrative embodiments recognize and take into account that an infection by malware may occur after installation. Moreover, the application packagers, application testers, or application developers, may work on systems where a full anti-virus scan may take a long time to complete running the scan on all files.

The illustrative embodiments recognize and take into account that time may be saved and final reports made clearer by selectively scanning for malware by applications. In an illustrative embodiment, scanning the group of files for the application for the malware to obtain a result may comprise parsing the block to form a list of files and registry variables, passing the list of files and registry variables to a scanner, and retrieving.

The different illustrative embodiments provide a method, data processing system, and computer program product for processing files. A group of files for an application installed on a computer system is identified in response to a request to scan the application for malware. The group of files for the application is scanned for the malware. A result is obtained. An action is performed based on the result.

Referring to FIG. 1, an illustration of a block diagram of a computer system is depicted in accordance with an illustrative embodiment. Software management environment 100 may have computer system 110. As used herein, a computer system is one or more computers, if more than one could be on a network or otherwise in communication with each other. Computer system 110 may be subject to malware, and a function of software management environment 100 may be to protect computer system 110 from malware. In order to protect computer system 110 from malware, software management 120 may identify, by computer system 110, group of files 140 for application 130 installed on computer system 110 in response to user input 122. As used herein, identifying may include identifying the files, the location of the files, and an association of the file. The illustrative embodiments recognize and take into account that a manager may identify the files related to any particular application installed in any machine, local or distributed, and scan a portion of the file system(s) to retrieve information not only on the infected files but also on the infected application modules (that is the modules that make use of infected files), thereby allowing a user to downgrade specific components of the application instead of simply removing infected files or placing infected files into a quarantine. The illustrative embodiments recognize and take into account that a manager may be IBM's Tivoli Configuration Manager (TCM) that manages Software Package Blocks (SPB) on Windows endpoints using a Software Install Engine (SIE) installer runtime as modified in FIG. 2.

User input 122 may be a request by a user or user input 122 may be a scheduled request for a scan of application 130. After identifying group of files 140, software management 120 may request scanner 150 to scan group of files 140 for application 130 for malware to obtain result 160. As used herein, scanner means software used to gather hardware information and software information from systems and devices and may include, without limitation, anti-virus programs and anti-malware programs. In response to receiving result 160 from scanner 150, software management 120 may perform an action based on the result. As used herein, action 170 may include, without limitation, a report, an alert, removal of a file, and/or some other suitable action. Action 170 may be performed automatically or after a confirmation by a user.

Figure 2:
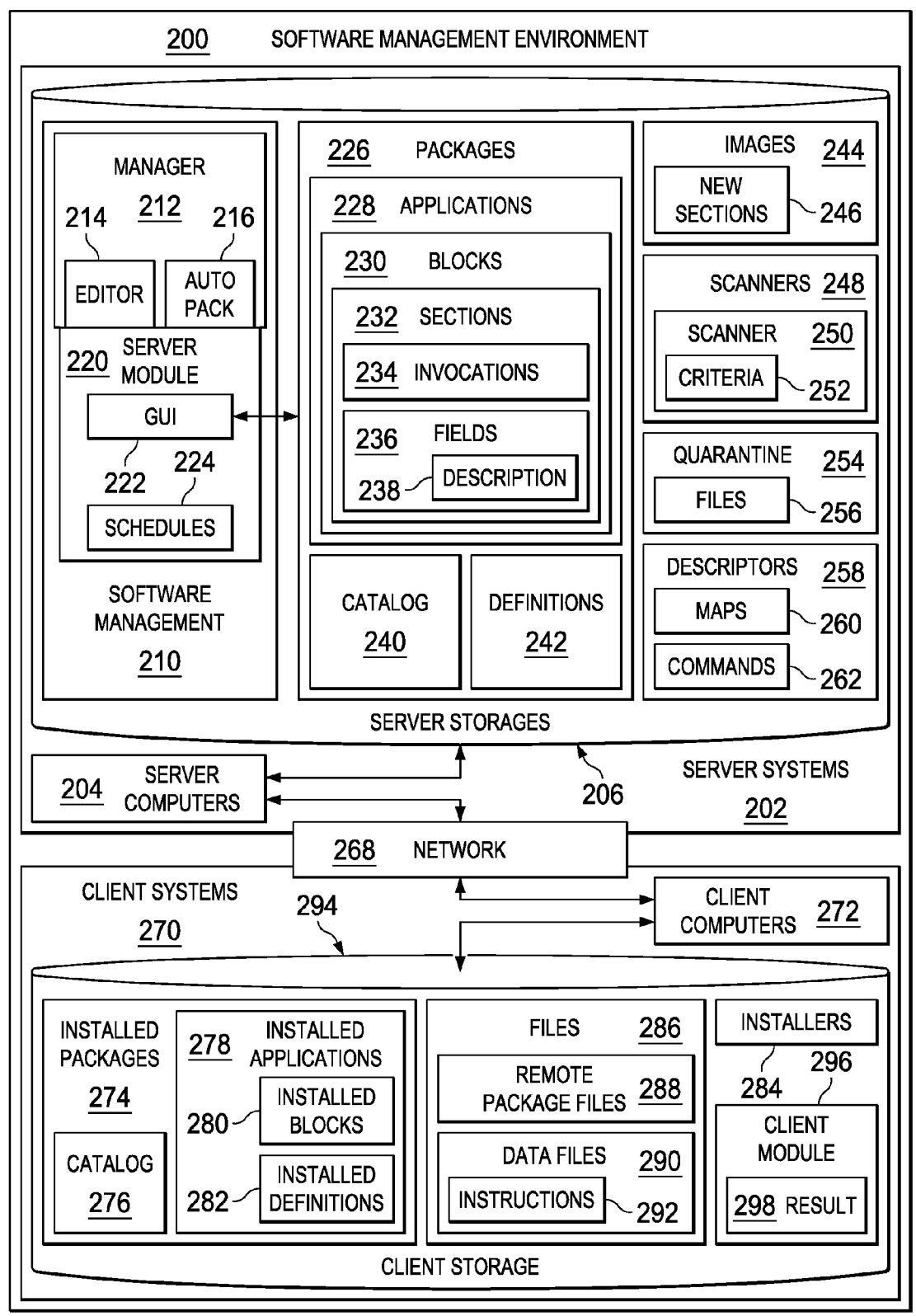
FIG. 2 is an illustration of a block diagram of a software management environment in accordance with an illustrative embodiment.

FIG. 2 is an illustration of a block diagram of a software management environment in accordance with an illustrative embodiment. Software management environment 200 may have a number of server systems 202 operably coupled to a number of client systems 270 by network 268. A "number", as used herein with reference to an item, means one or more items.

Server computers 204 may have a number of server computers operably coupled to a number of server storages 206. Server storages 206 may have server data stored therein. For example, server storages 206 may have software management 210, packages 226, images 244, scanners 248, quarantine 254, and descriptors 258 stored therein.

Software management 210 may comprise manager 212, editor 214, auto pack 216, server module 220, graphical user interface 222 and schedules 224.

The illustrative embodiments recognize and take into account that the manager may scan for viruses in a granular way by selecting specific applications instead of file system directories. The illustrative embodiments recognize and take into account that scanning for viruses in a granular way by selecting specific applications instead of file system directories permits scheduling of scans in a flexible manner. As used herein, AutoPack is a tool available in Tivoli Software Distribution, Version 4 that enables an administrator to create a software package. AutoPack may be referred to as AutoPack technology. AutoPack produces the software package by (a) taking snapshots of the drive and system configuration before and after the installation of an application on a PC and (b) including the differences between these snapshots in the software package. As used herein, "snapshot" means an image of a drive and system configuration, and "taking a snapshot" means creating an image of a drive system and configuration. The illustrative embodiments recognize and take into account that an image may include a representation of a computer system program and its related data such as the kernel, file systems, libraries, and programs of a computer system at a given point in time. The illustrative embodiments recognize and take into account that AutoPack may be found at least in Tivoli Software Distribution, Version 4. As used herein, software package editor means a graphical user interface (GUI) for creating and customizing software packages. An example of a software package editor may be found at least in Tivoli Software Distribution, Version 4.

Packages 226 may comprise applications 228, catalog 240, and definitions 242. Catalog 240 may list all packages, such as packages 226, managed by manager 212 in software management 210. A package may be a software package. As used herein "software package" means a database object that contains a sequential list of actions to be executed on a target system. An example of a software package block may be found at least in Tivoli Software Distribution, Version 4. As used herein, software package definition means an ASCII text file used to describe package contents. As used herein, a definition may be a software package definition consisting of a sequence of stanzas that describe commands to be executed. An example of a software package definition may be found at least in Tivoli Software Distribution, Version 4. Applications 228 may comprise blocks 230, sections 232, and fields 236. Sections 232 may comprise invocations 234.

As used herein, a software package block is a file that contains the resources referred to by the actions in a software package. An example of a software package block may be found at least in Tivoli Software Distribution, Version 4. In an illustrative embodiment, a block format of a block such as may be found in blocks 230 may be modified by server systems 202 by adding a number of new stanzas containing a map between a file name and an application module name, responsive to a report identifying a file as infected with malware, downgrading the application by removing a module mapped to the file name by a stanza in the block. Such stanzas may be in sections 232. In an illustrative embodiment server, server systems 202 may modify a block format by adding to a stanza used for files/registries, a field for a functional description, and thereafter, responsive to a report identifying a file as infected with malware, downgrade the application by removing a module associated with the functional description. Such functional descriptions may be stored in description 238 in fields 236 of blocks 230 in packages 226 stored in server storages 206.

The illustrative embodiments recognize and take into account that a section may comprise a stanza. As used herein, "stanza" means a section of a software package definition. A stanza can define, for example, an action to be performed, a list of targets on which the action is to be performed, or a set of conditions under which an action is to be executed. The illustrative embodiments recognize and take into account that stanzas can be nested, and there is a single stanza (the root stanza) that contains the entire software package definition. An example of a stanza may be found at least in Tivoli Software Distribution, Version 4.

Fields 236 may comprise description 238. The illustrative embodiments recognize and take into account that definitions of functions may be used to un-install or downgrade specific modules to remove only modules associated with infected files without impacting other application functionalities. Images 244 may include new sections 246. Images 244 may be saved copies of memory and may include contents of all memory bytes, hardware registers and status indicators associated with a block, a file, or an application. A snapshot may be an image taken at a given point in time.

Scanners 248 may comprise scanner 250. Scanner 250 may be a program configured to detect software in response to one or more criteria such as criteria 252. Thus, scanner 250 may comprise criteria 252. Criteria 252 may identify malicious software. Quarantine 254 may comprise files 256. Files 256 may be infected by malicious software which have been identified by a scanner such as an anti-virus program and then placed into quarantine 254.

Descriptors 258 may comprise maps 260 and commands 262. The illustrative embodiments recognize and take into account that applications that can de-install or downgrade specific modules may allow the scanning program or its caller to remove only infected modules without impacting other application functionalities.

Client systems 270 may comprise client computers 272 and client storage 294. Client module 296 may include result 298 received from one of scanners 248. Client storages may have client data stored therein. Client data may be, for example, installed packages 274, installers 284, and files 286. Installed packages 274 may comprise catalog 276 and installed applications 278. Installed applications 278 may comprise installed blocks 280 and installed definitions 282. The illustrative embodiments recognize and take into account that applications may have all installation files embedded in an installer, may contain references to remote files that are resolved and retrieved at installation time, or may invoke external installers as part of their installation. Installers 284 may be software install engine (SIE) installers.

Files 286 may comprise remote package files 288 and data files 290. The illustrative embodiments recognize and take into account that the an association between a file and the application functionality that the file exploits may be provided by a software package provider, or may be added by a user through the an editor. For example, an enhanced package format may be provided that allows, in the stanza used for the files/registries, a specific field for the functional description. Data files 290 may comprise instructions 292.

Figure 3:
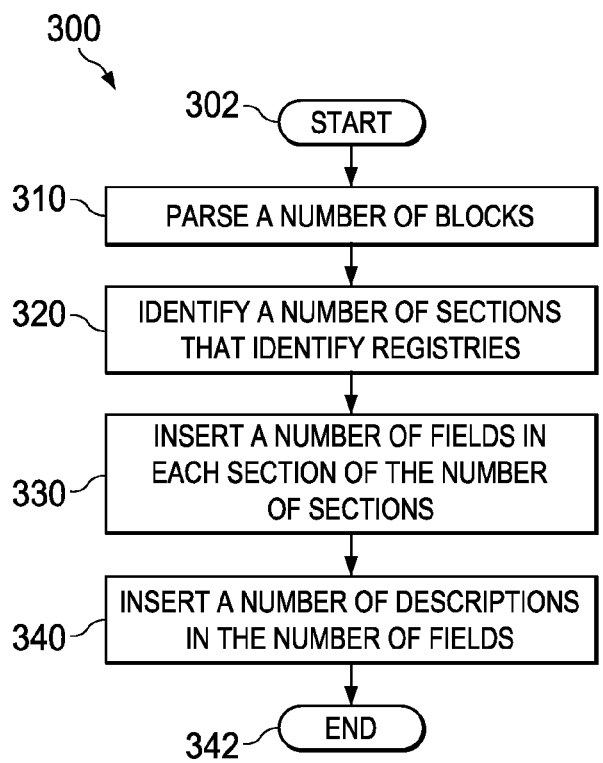
FIG. 3 is a flowchart of a configuration process in accordance with an illustrative embodiment.

Referring to FIG. 3, a flowchart of a configuration process is depicted in accordance with an illustrative embodiment. Configuration process 300 starts (step 302) and parses a number of blocks (step 310). Configuration process may be part of software management 120 in FIG. 1 and software management 210 in FIG. 2.

Configuration process 300 identifies a number of sections that identify registries (step 320). Configuration process 300 may identify sections 232 in blocks 230 of applications 228 in packages 226 in server storages 206 of FIG. 2. Process 300 inserts a number of fields in each section of the number of sections (step 330). Fields may be fields 236 in sections 232 of FIG. 2. Process 300 inserts a number of descriptions in the number of fields (step 340). Descriptions may be description 238 in fields 236 of FIG. 2. Process 300 ends (step 342).

Figure 4:
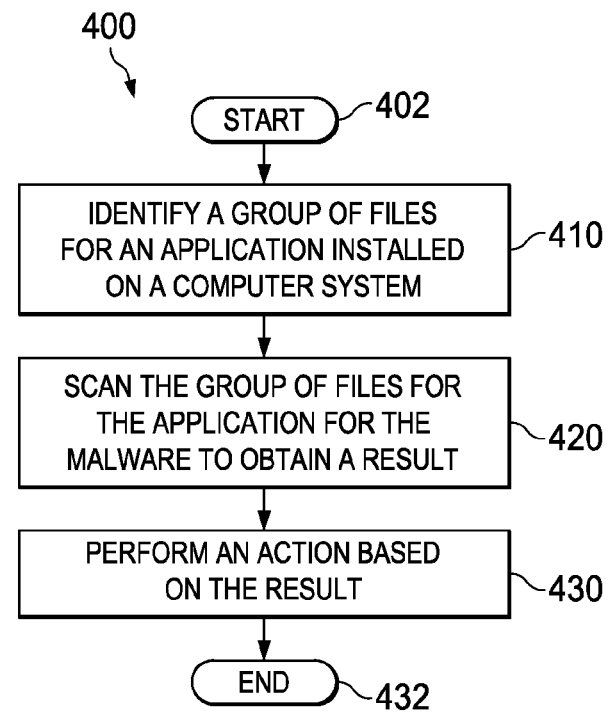
FIG. 4 is a flowchart of a management process in accordance with an illustrative embodiment.

Referring now to FIG. 4, a flowchart of a management process is depicted in accordance with an illustrative embodiment. Management process 400 may be part of software management 120 in FIG. 1 and software management 210 in FIG. 2.

Process 400 starts (step 402) and identifies a group of files for an application installed on a computer system (step 410). In an illustrative embodiment, process 400 may start in response to a request by a user to scan the application for malware. Request by a user may be user input in FIG. 1 and may be received by server module 220 from client module 296 in FIG. 2. In another illustrative embodiment, process 400 may be invoked by a server module, such as server module 220 in FIG. 2, sending a request for a scan on a block to a client module, such as client module 296 in FIG. 2, or running on a software install engine in client systems 270. Process 400 scans the group of files for the application for the malware to obtain a result (step 420). Scanning may be performed by scanner 250 in FIG. 2. Process 400 performs an action based on the result (step 430). Examples of actions that may be taken based on the result include without limitation, sending an alert, making a log entry, sending a file to quarantine such as quarantine 254 in FIG. 2, or displaying a request to a user to select an action such as at client module 296 in FIG. 2. Result may be result 298 in FIG. 2. Process 400 ends (step 432).

Figure 5:
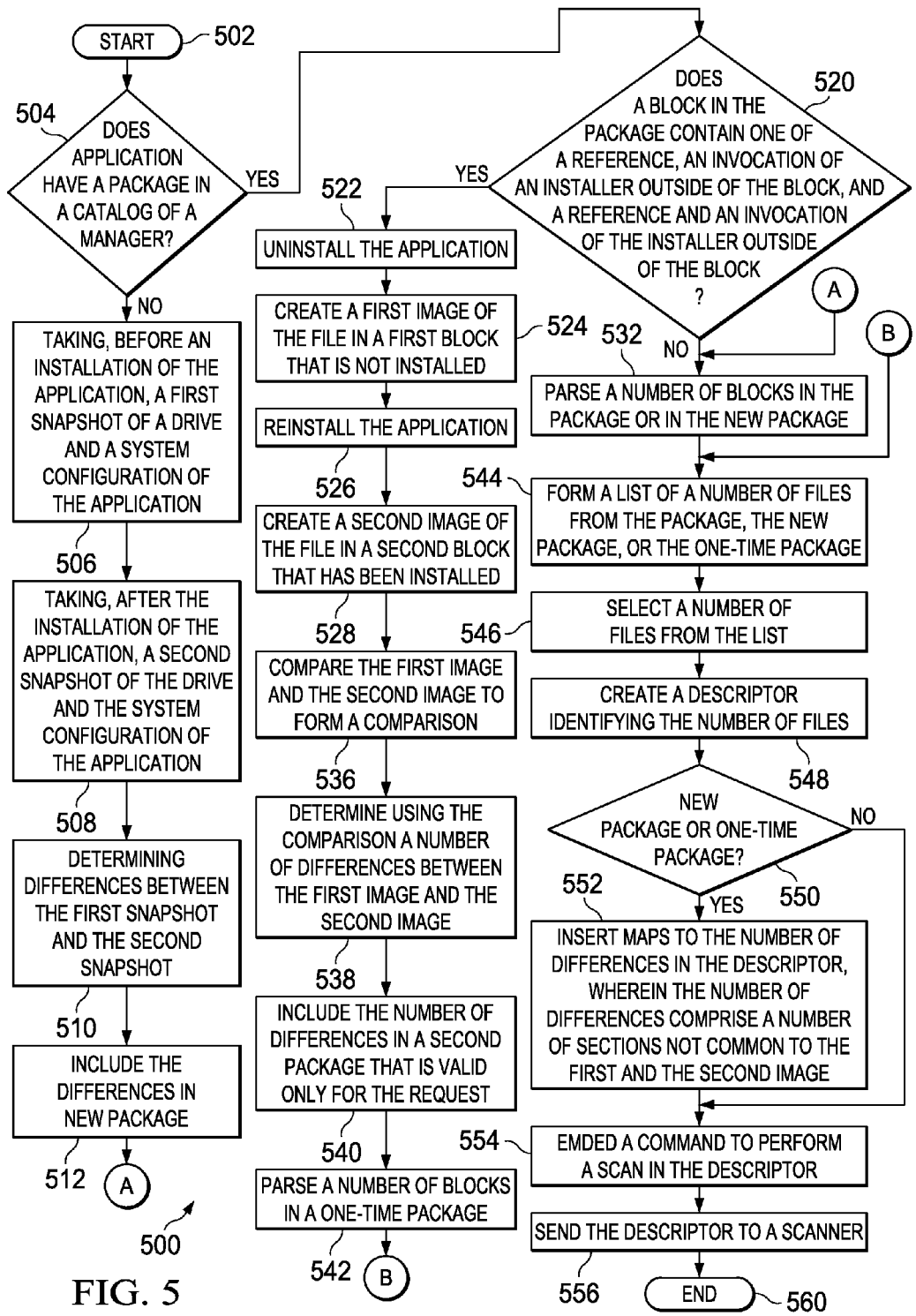
FIG. 5 is a flowchart of an enhanced management process in accordance with an illustrative embodiment.

Referring to FIG. 5, a flowchart of an enhanced management process is depicted in accordance with an illustrative embodiment. Enhanced management process 500 may be part of software management 120 in FIG. 1 and software management 210 in FIG. 2. Process 500 starts (step 502) and determines whether a package for an application is in a catalog of a manager (step 504). In an illustrative embodiment, the catalog may be catalog 240 in FIG. 2. If at step 504, the determination is that the package is not in the catalog, then process 500 takes, before an installation of the application, a first snapshot of a drive and system configuration of the application (step 506). Process 500 then takes, after the installation of the application, a second snapshot of the drive and the system configuration of the application (step 508). Process 500 determines differences between the first snapshot and the second snapshot (step 510). First snapshot and second snapshot may be images 244 in FIG. 2. Differences may be new sections 246 in FIG. 2. Process 500 includes the differences in a new package of the installed application (step 512). A new package may be a package in installed packages 274 in FIG. 2. Process 500 then goes to step 520.

Process 500 determines whether one or more blocks in the package contain any references or invocations of an installer outside of the block (step 520). Installer may be an installer in installers 284 in FIG. 1. References may be references to remote package files 288 in FIG. 2. If at step 520, process 500 determines that the application does have a package in the catalog of the manager, process 500 uninstalls the application (step 522). Process 500 creates a first image of the file in a first block that is not installed (step 524). Process 500 reinstalls the application (step 526). Process 500 creates a second image of the file in a second block that has been installed (step 528). Process 500 compares the first image and the second image to form a comparison (step 536). Process 500 compares the first image and the second image to form the comparison in order to identify any files associated with the application after installation due to the references or invocations of an installer outside of the block. Process 500, using the comparison, determines a number of differences between the first image and the second image (step 538). Process 500 includes the number of differences in a one-time package that is valid only for the request (step 540). By including the number of differences in the third package that is valid only for the scan, Process 500 ensures that all files associated with the application after installation due to the references or invocations will be available for inclusion in a list of files to be scanned.

If, at step 520, process 500 determines that one or more blocks in the package or the new package do not contain any references or invocations of an installer outside of the block, process 500 parses a number of blocks in the package or the new package (step 532). Process 500, after parsing the number of blocks in the package or the new package at step 532, or after parsing a number of blocks in the one-time package at step 542, forms a list of a number of files from the package, the new package, or the one-time package (step 544). Thereafter, process 500 selects a number of files from the list (step 546). In an illustrative embodiment, the number of files may be all of the files in the package, or in other words, all of the files in the application and that one associated with the application. In another illustrative embodiment, the number of files may be less than all of the files in the package, and a selection of the number of files may be made by configuring one or more of manager 212, server module 220, and client module 296 to select certain files in the package. In a further embodiment, the number of files may be selected by a user using a module such as client module 296 in FIG. 2. Thereafter, process 500 creates a descriptor identifying the number of files (step 548). Process 500 determines whether a package is a new package or a one-time package (step 550). For the one-time package or the new package, process 500 inserts a number of maps to the number of differences in the descriptor (step 552). The descriptor may be one of descriptors 258 in FIG. 2, and a may be one of maps 260 in descriptors 258. Process 500 embeds a command to perform a scan in the descriptor (step 554). The command may be one of commands 262 in FIG. 2. Process 500 sends the descriptor to a scanner (step 556). The scanner may be scanner 250 in FIG. 2. Process 500 ends (step 560).

Figure 6:
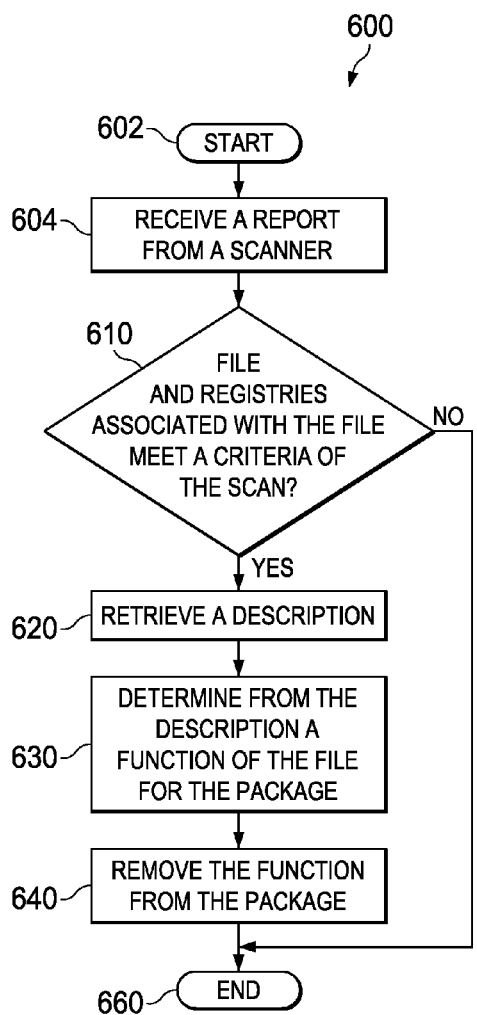
FIG. 6 is a flowchart of an action process in accordance with an illustrative embodiment.

Referring to FIG. 6, a flowchart of a removal process is depicted in accordance with an illustrative embodiment. In an illustrative embodiment, process 600 may be a process performed by software management 120 in FIG. 1. In another illustrative embodiment, process 600 may be performed by manager 212 in software management 210 in FIG. 2. Process 600 begins (step 602) and receives a report from a scanner (step 604). In an illustrative embodiment, the report may be result 160 in FIG. 1. In another embodiment, the report may be result 298 in FIG. 2. Process 600 determines from the report whether any files and registries associated with any files meet a criteria of the scan (step 610). If no files and registries associated with the files meet the criteria of the scan, process 600 stops (step 660). In response to a determination that any files and registries associated with the files meet a criterion of the scan, process 600 retrieves a description (step 620). In an illustrative embodiment, the criterion of the scan may be criteria 252 in FIG. 2. In an illustrative embodiment, description may be description 238 in FIG. 2. Process 600 determines from the description, a function of the file for the package (step 630). The package may be one of packages 226 in FIG. 2. The function may be a section such as one of sections 232 in FIG. 2. Process 600 removes the function from the package (step 640). Process 600 ends (step 660).

Figure 7:
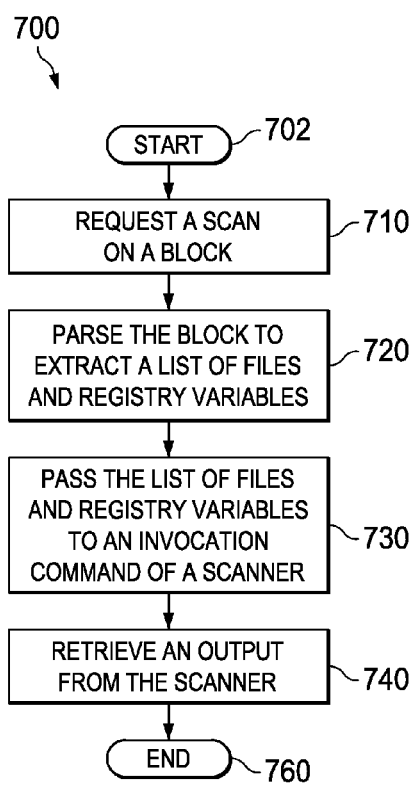
FIG. 7 is a flowchart of a client and server process in accordance with an illustrative embodiment.

Referring to FIG. 7, a flowchart of a client and server process is depicted in accordance with an illustrative embodiment. In an illustrative embodiment, process 700 may be a process performed by software management 120 in FIG. 1. In another illustrative embodiment, process 700 may be performed by manager 212 in software management 210 in FIG. 2. Process 700 starts (step 702) and requests a scan on a block (step 710). Process 700 parses the block to form a list of files and registry variables (step 720). Process 700 passes the list of files and registry variables to a scanner (step 730). In an illustrative embodiment, the list of files may be contained in a descriptor such as one of descriptors 258 in FIG. 2. Descriptor 258 may contain a command such as one of commands 262 in FIG. 2. The command may be an invocation command for a scanner such as scanner 250 to scan the files in the list of files. Process 700, at the client module, retrieves an output from the scanner (step 740). In an illustrative embodiment, client module may be client module 296 in FIG. 2. Process 700, at the client module, may send the output to the server module 220 in FIG. 2. The illustrative embodiments recognize and take into account that server module 220 may reside in server systems 202 and client module 296 may reside in client systems 270, and also that server module 220 and client module 296 may be reside in server systems 202 or in client systems 270. Process 700 stops (step 760)

Figure 8:
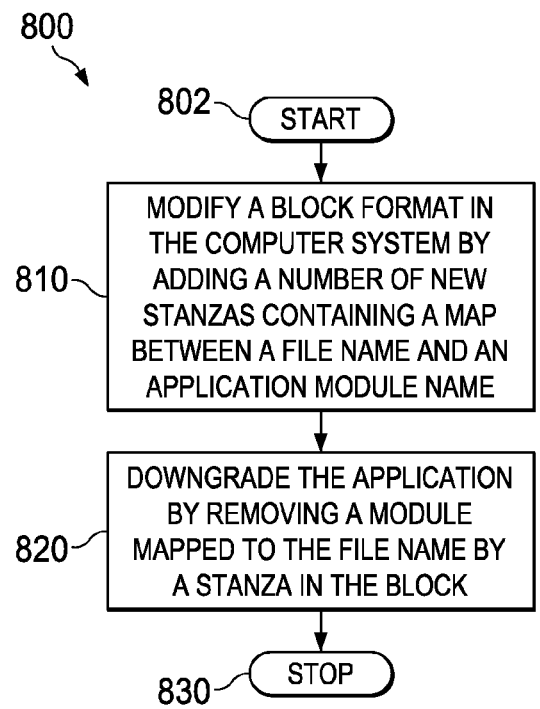
FIG. 8 is a flowchart of a block format modification in accordance with an illustrative embodiment.

Referring to FIG. 8, a flowchart of a block format modification is depicted in accordance with an illustrative embodiment. In an illustrative embodiment, process 800 may be part of server module 220 in FIG. 2. Process 800 starts (step 802) and modifies a block format in a computer system by adding a number of new stanzas containing a map between a file name and an application module name (step 810). In an illustrative embodiment, block may be one of blocks 230 in FIG. 2 having a format in which a name of the block may be a field in fields 236, and the application module name may be description 238 in fields 236. In an illustrative embodiment, the new stanzas may be one or more of sections 232 in FIG. 2 that may provide the map between one of fields 236 and description 238 in FIG. 2. Process 800 downgrades the application by removing a module mapped to the file name by a stanza in the block (step 820). In an illustrative embodiment, one of applications 228 in FIG. 2 may be downgraded by removing a block such as one of blocks 230 associated with a name in fields 236 mapped to description 238 by a section of sections 232. Process 800 stops (830).

Figure 9:
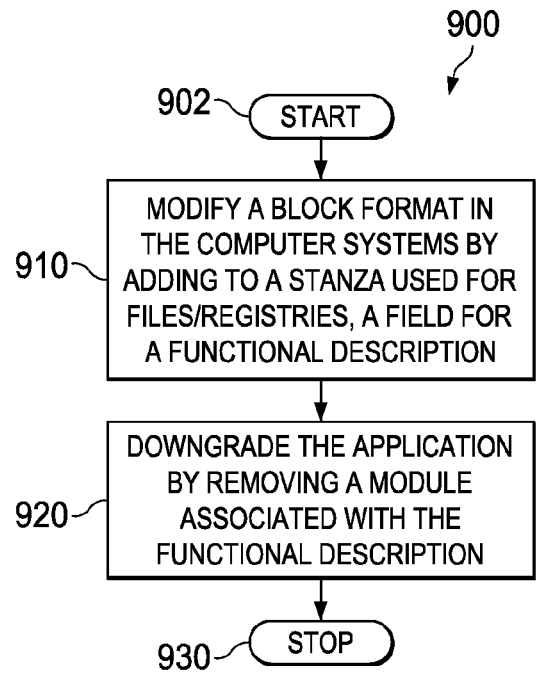
FIG. 9 is a flowchart of a second block format modification in accordance with an illustrative embodiment.

Referring to FIG. 9, a flowchart of a second block format modification is depicted in accordance with an illustrative embodiment. In an illustrative embodiment, process 900 may be part of server module 220 in FIG. 2. Process 900 starts (step 902) and modifies a block format in the computer system by adding to a stanza used for files/registries, a field for a functional description (step 910). In an illustrative embodiment, block may be one of blocks 230 in FIG. 2 having a format in which a name of a file/registry may be a field in fields 236 and the functional description may be description 238 in fields 236. In an illustrative embodiment, the stanza may be one or more of sections 232 in FIG. 2. Process 900 downgrades the application by removing a module associated with the functional description (step 920). Process 900 stops (step 930).

Figure 10:
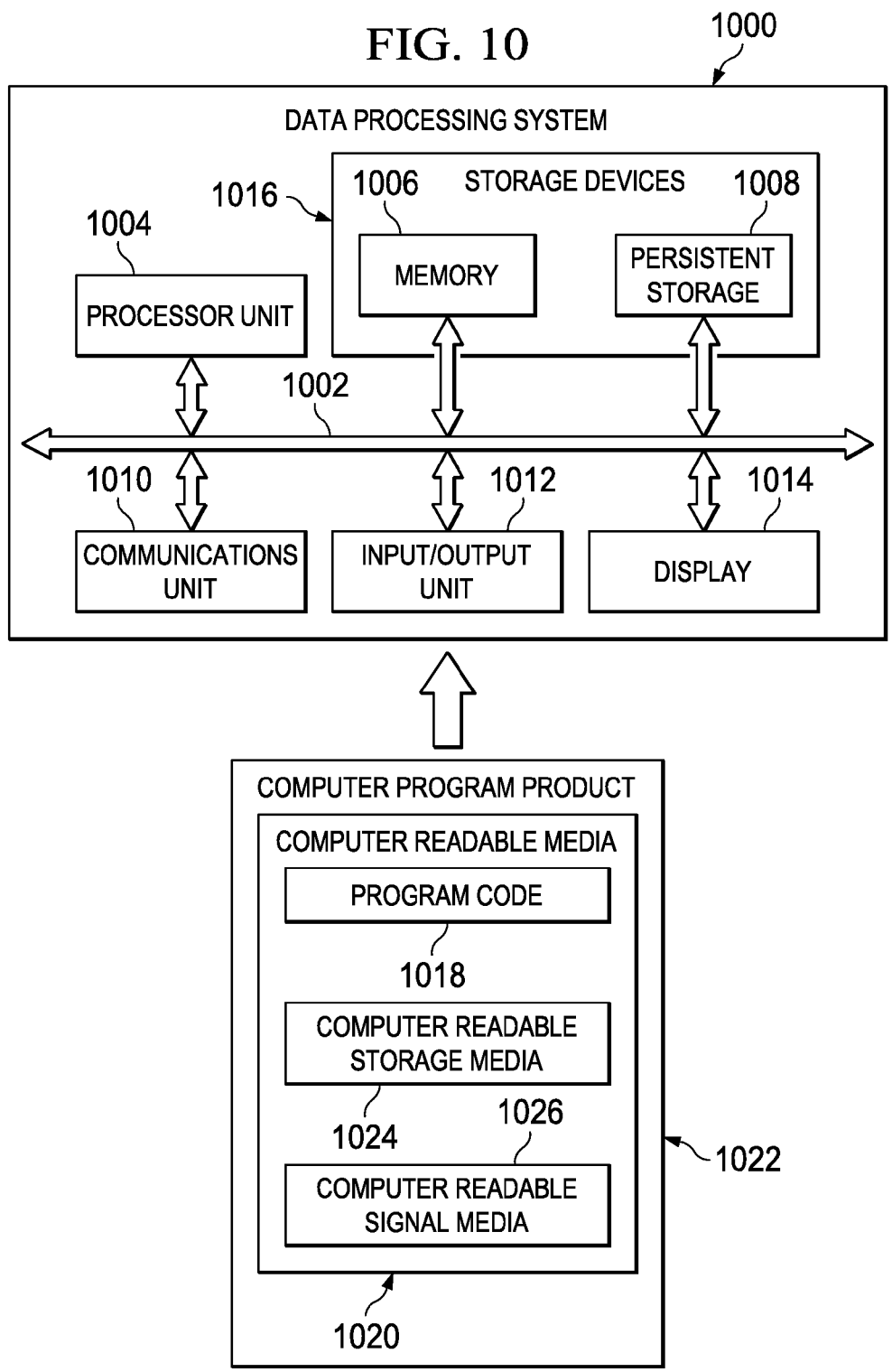
FIG. 10 is a block diagram of a data processing system in accordance with an illustrative embodiment.

Turning now to FIG. 10, an illustration of a block diagram of a data processing system is depicted in accordance with an illustrative embodiment. In this illustrative example, data processing system 1000 includes communications fabric 1002, which provides communications between processor unit 1004, memory 1006, persistent storage 1008, communications unit 1010, input/output (I/O) unit 1012, and display 1014. In these illustrative examples, data processing system 1000 may be used to implement one or more computers in computer system 110 in FIG. 1.

Processor unit 1004 serves to process instructions for software that may be loaded into memory 1006. Processor unit 1004 may be a number of processors, a multi-processor core, or some other type of processor, depending on the particular implementation. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communication links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for processing by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and processed by a processor in processor unit 1004. The program code in the different embodiments may be embodied on different physical or tangible computer readable media, such as memory 1006 or persistent storage 1008.

Program code 1018 is located in a functional form on computer readable media 1020 that is selectively removable and may be loaded onto or transferred to data processing system 1000 for processing by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000. In these illustrative examples, computer readable storage media 1024 is a non-transitory computer readable storage medium.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communication links, such as wireless communications link, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

Storage devices 1016 are examples of implementations of server storages 206 and client storage 294 in FIG. 2. Further, program code 1018 may include program code for process 400 depicted in FIG. 4, process 500 depicted in FIG. 5 and process 600 depicted in FIG. 6. For example, program code 1018 is an example of a computer program product.

The different components illustrated for data processing system 1000 are not meant to provide architectural limitations to the manner in which different embodiments may be implemented. The different illustrative embodiments may be implemented in a data processing system including components in addition to, or in place of, those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

As another example, a storage device in data processing system 1000 is any hardware apparatus that may store data. Memory 1006, persistent storage 1008, and computer readable media 1020 are examples of storage devices in a tangible form.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, illustrative embodiments of the present invention provide a computer implemented method, computer system, and computer program product for processing files by identifying a group of files for an application installed on the computer system in response to a request to scan the application for malware, scanning the group of files for the application for the malware to obtain a result, and performing an action based on the result.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing malware comprising:

identifying, by a computer system, a group of files for an application installed on the computer system in response to a request to scan the application for the malware;

determining, by the computer system, whether the application installed on the computer system has a package in a catalog of a manager;

responsive to the computer system determining that the application installed on the computer system does have the package in the catalog of the manager, determining, by the computer system, whether a block in the package contains a reference to a remote file that is retrieved at installation of the application;

responsive to the computer system determining that the block contains the reference to the remote file that is retrieved at the installation of the application, uninstalling, by the computer system, the application installed on the computer system;

generating, by the computer system, a first image of the group of files for the application not installed on the computer system;

reinstalling, by the computer system, the application on the computer system;

generating, by the computer system, a second image of the group of files for the application reinstalled on the computer system;

comparing, by the computer system, the first image and the second image of the group of files for the application to form a comparison;

determining, by the computer system, a number of differences between the first image and the second image of the group of files for the application based on the comparison;

including, by the computer system, the number of differences between the first image and the second image of the group of files for the application in a second package that is valid only for the request to scan the application for the malware;

parsing, by the computer system, a number of blocks in the second package;

responsive to the computer system parsing the number of blocks in the second package, forming, by the computer system, a list of files for the application;

selecting, by the computer system, a number of files from the list of files;

generating, by the computer system, a descriptor identifying the number of files selected from the list of files;

placing, by the computer system, a command to perform the scan for the malware in the descriptor identifying the number of files;

sending, by the computer system, the descriptor with the command to perform the scan for the malware to a scanner;

scanning, by the computer system, the number of files for the application for the malware using the scanner to obtain a report corresponding to the scan;

modifying, by the computer system, a block format in the computer system by adding a number of new stanzas containing a map between a file name and an application module name; and responsive to the computer system identifying in the report a file in the number of files for the application as infected with the malware, downgrading, by the computer system, the application by removing only a specific module that uses the file infected with the malware from the application without impacting other functionalities of the application, wherein the application module name of the specific module is mapped to the file name of the file infected with the malware by a stanza in the number of new stanzas in the modified block format in the computer system.

2. The method of claim 1, responsive to the computer system determining that the block does not contain a reference to a remote file, parsing, by the computer system, a number of blocks in the package;

responsive to the computer system parsing the number of blocks in the package, forming, by the computer system, a list of a number of files in the package;

selecting, by the computer system, a number of files from the list;

generating, by the computer system, a descriptor identifying the number of files selected from the list;

placing, by the computer system, a command to perform the scan for the malware in the descriptor identifying the number of files selected from the list; and sending, by the computer system, the descriptor with the command to perform the scan for the malware to the scanner.

3. The method of claim 1, further comprising:

inserting, by the computer system, maps to the number of differences in the descriptor, wherein the number of differences comprises a number of sections not common to the first image and the second image of the group of files for the application.

4. The method of claim 1, further comprising:

responsive to the computer system determining that the application installed on the computer does not have the package in the catalog of the manager, taking, by the computer system, before the installation of the application, a first snapshot of a drive and a system configuration of the application;

taking, by the computer system, after the installation of the application, a second snapshot of the drive and the system configuration of the application;

determining, by the computer system, differences between the first snapshot and the second snapshot of the drive and the system configuration of the application; and including, by the computer system, the differences in the package.

5. The method of claim 1, wherein the scanning, by the computer system, of the number of files for the application for the malware using the scanner to obtain the report corresponding to the scan further comprises:

parsing, by the computer system, the number of blocks in the second package to form the list of files and registry variables for the application;

passing, by the computer system, the list of files and the registry variables for the application to the scanner; and retrieving, by the computer system, an output from the scanner.

6. The method of claim 1, further comprising:

modifying, by the computer system, the block format in the computer system by adding to a stanza a field for a functional description for files; and responsive to the computer system identifying in the report a file as infected with the malware, downgrading, by the computer system, the application by removing a module associated with the functional description from the application without impacting other functionalities of the application.

7. An apparatus for managing malware comprising:

a computer system; and program code stored on the computer system, wherein the computer system is configured by the program code to:

identify a group of files for an application installed on the computer system in response to request to scan the application for malware;

determine whether the application installed on the computer system has a package in a catalog of a manager;

determine whether a block in the package contains a reference to a remote file that is retrieved at installation of the application in response to determining that the application installed on the computer system does have the package in the catalog of the manager;

uninstall the application installed on the computer system in response to determining that the block contains the reference to the remote file that is retrieved at the installation of the application;

generate a first image of the group of files for the application not installed on the computer system;

reinstall the application on the computer system;

generate a second image of the group of files for the application reinstalled on the computer system;

compare the first image and the second image of the group of files for the application to form a comparison;

determine a number of differences between the first image and the second image of the group of files for the application based on the comparison;

include the number of differences between the first image and the second image of the group of files for the application in a second package that is valid only for the request to scan the application for the malware;

parse a number of blocks in the second package;

form a list of files for the application in response to parsing the number of blocks in the second package;

select a number of files from the list of files;

generate a descriptor identifying the number of files selected from the list of files;

place a command to perform the scan for the malware in the descriptor identifying the number of files;

send the descriptor with the command to perform the scan for the malware to a scanner;

scan the number of files for the application for the malware using the scanner to obtain a report corresponding to the scan;

modify a block format in the computer system by adding a number of new stanzas containing a map between a file name and an application module name; and downgrade the application by removing only a specific module that uses a file infected with the malware from the application without impacting other functionalities of the application in response to identifying in the report the file in the number of files for the application as infected with the malware, wherein the application module name of the specific module is mapped to the file name of the file infected with the malware by a stanza in the number of new stanzas in the modified block format in the computer system.

8. The apparatus of claim 7, wherein the program code further configures the computer system to:
  parse a number of blocks in the package in response to determining that the block does not contain a reference to a remote file;
  form a list of a number of files in the package in response to parsing the number of blocks in the package;
  select a number of files from the list;
  generate a descriptor identifying the number of files selected from the list;
  include a command to perform the scan for the malware in the descriptor identifying the number of files selected from the list; and
  send the descriptor with the command to perform the scan for the malware to the scanner.

9. The apparatus of claim 7, wherein the program code further configures the computer system to:
  insert maps to the number of differences in the descriptor, wherein the number of differences comprises a number of sections not common to the first image and the second image of the group of files for the application.

10. The apparatus of claim 7, wherein the program code further configures the computer system to:
  take, before the installation of the application, a first snapshot of a drive and a system configuration of the application in responsive to determining that the application installed on the computer does not have the package in the catalog of the manager;
  take, after the installation of the application, a second snapshot of the drive and the system configuration of the application;
  determining differences between the first snapshot and the second snapshot of the drive and the system configuration of the application; and
  include the differences in the package.

11. The apparatus of claim 7, wherein the program code to scan the number of files for the application for the malware using the scanner to obtain the report corresponding to the scan further configures the computer system to:
  parse the number of blocks in the second package to form the list of files and registry variables for the application;
  pass the list of files and the registry variables for the application to the scanner; and
  retrieve an output from the scanner.

12. The apparatus of claim 7, wherein the computer system is further configured by the program code to:
  modify the block format in the computer system by adding to a stanza a field for a functional description for files; and
  downgrade the application by removing a module associated with the functional description from the application without impacting other functionalities of the application in response to identifying in the report a file as infected with the malware.

13. A computer program product for managing malware comprising:
  a non-transitory computer-readable storage medium having computer-readable program code embodied therewith that is executable by a computer system, the computer-readable program code comprising;
  computer-readable program code configured to identify a group of files for an application installed on the computer system in response to request to scan the application for malware;
  computer-readable program code configured to determine whether the application installed on the computer system has a package in a catalog of a manager;
  computer-readable program code configured to determine whether a block in the package contains a reference to a remote file that is retrieved at installation of the application in response to determining that the application installed on the computer system does have the package in the catalog of the manager;
  computer-readable program code configured to uninstall the application installed on the computer system in response to determining that the block contains the reference to the remote file that is retrieved at the installation of the application;
  computer-readable program code configured to generate a first image of the group of files for the application not installed on the computer system;
  computer-readable program code configured to reinstall the application on the computer system;
  computer-readable program code configured to generate a second image of the group of files for the application reinstalled on the computer system;
  computer-readable program code configured to compare the first image and the second image of the group of files for the application to form a comparison;
  computer-readable program code configured to determine a number of differences between the first image and the second image of the group of files for the application based on the comparison;
  computer-readable program code configured to include the number of differences between the first image and the second image of the group of files for the application in a second package that is valid only for the request to scan the application for the malware;
  computer-readable program code configured to parse a number of blocks in the second package;
  computer-readable program code configured to form a list of files for the application in response to parsing the number of blocks in the second package;
  computer-readable program code configured to select a number of files from the list of files;
  computer-readable program code configured to generate a descriptor identifying the number of files selected from the list of files;
  computer-readable program code configured to place a command to perform the scan for the malware in the descriptor identifying the number of files;
  computer-readable program code configured to send the descriptor with the command to perform the scan for the malware to a scanner;
  computer-readable program code configured to scan the number of files for the application for the malware using the scanner to obtain a report corresponding to the scan;
  computer-readable program code configured to modify a block format in the computer system by adding a number of new stanzas containing a map between a file name and an application module name; and
  computer-readable program code configured to downgrade the application by removing only a specific module that uses a file infected with the malware from the application without impacting other functionalities of the application in response to identifying in the report the file in the number of files for the application as infected with the malware, wherein the application module name of the specific module is mapped to the file name of the file infected with the malware by a stanza in the number of new stanzas in the modified block format in the computer system.

14. The computer program product of claim 13, further comprising:
- computer-readable program code configured to parse a number of blocks in the package in response to determining that the block does not contain a reference to a remote file;
- computer-readable program code configured to form a list of a number of files in the package in response to parsing the number of blocks in the package;
- computer-readable program code configured to select a number of files from the list;
- computer-readable program code configured to generate a descriptor identifying the number of files selected from the list;
- computer-readable program code configured to place a command to perform the scan for the malware in the descriptor identifying the number of files selected from the list; and
- computer-readable program code configured to send the descriptor with the command to perform the scan for the malware to the scanner.

15. The computer program product of claim 13, further comprising:
- computer-readable program code configured to insert maps to the number of differences in the descriptor, wherein the number of differences comprises a number of sections not common to the first image and the second image of the group of files for the application.

16. The computer program product of claim 13, further comprising:
- computer-readable program code configured to take, before the installation of the application, a first snapshot of a drive and a system configuration of the application in responsive to determining that the application installed on the computer does not have the package in the catalog of the manager;
- computer-readable program code configured to take, after the installation of the application, a second snapshot of the drive and the system configuration of the application;
- computer-readable program code configured to determine differences between the first snapshot and the second snapshot of the drive and the system configuration of the application; and
- computer-readable program code configured to include the differences in the package.

17. The computer program product of claim 13, wherein the computer-readable program code configured to scan the number of files for the application for the malware using the scanner to obtain the report corresponding to the scan further comprises:
- computer-readable program code configured, to parse the number of blocks in the second package to form the list of files and registry variables for the application;
- computer-readable program code configured to pass the list of files and the registry variables for the application to the scanner; and
- computer-readable program code configured to retrieve an output from the scanner.

18. The computer program product of claim 13, further comprising:
- computer-readable program code configured to modify the block format in the computer system by adding to a stanza a field for a functional description for files; and
- computer-readable program code configured to downgrade the application by removing a module associated with the functional description from the application without impacting other functionalities of the application in response to identifying in the report a file as infected with the malware.

* * * * *